United States Patent [19]
Gorski et al.

[11] Patent Number: 5,634,590
[45] Date of Patent: Jun. 3, 1997

[54] DIRECT DIGITAL CONTROL THERMOSTAT

[75] Inventors: William H. Gorski, Long Grove; Wayne S. Lauer, Mundelein; Amy L. Ikenn, Grayslake, all of Ill.

[73] Assignee: Landis & Staefa, Inc., Buffalo Grove, Ill.

[21] Appl. No.: 482,609

[22] Filed: Jun. 7, 1995

Related U.S. Application Data

[63] Continuation-in-part of Ser. No. 276,119, Jul. 5, 1994, abandoned, which is a continuation-in-part of Ser. No. 78,605, Jun. 16, 1993, abandoned.

[51] Int. Cl.⁶ .............. G05D 23/00; F24F 7/00
[52] U.S. Cl. .............. 236/47; 236/49.3; 236/84
[58] Field of Search .............. 236/84, 51, 47, 236/49.3

[56] References Cited

U.S. PATENT DOCUMENTS

| | | | |
|---|---|---|---|
| 3,882,881 | 5/1975 | Mackenzie | 236/84 X |
| 4,172,555 | 10/1979 | Levine | 236/46 R |
| 4,298,946 | 11/1981 | Hartsell et al. | 364/557 |
| 4,388,692 | 6/1983 | Jones et al. | 364/557 |
| 4,410,132 | 10/1983 | Levine | 236/11 |
| 4,442,972 | 4/1984 | Sahay et al. | 236/46 R X |
| 4,639,876 | 1/1987 | Deeds | 236/94 X |
| 4,646,964 | 3/1987 | Parker et al. | 236/49.3 |
| 4,688,547 | 8/1987 | Ballard et al. | 126/116 A |
| 4,702,305 | 10/1987 | Beckey et al. | 236/46 R |
| 4,799,176 | 1/1989 | Cacciatore | 364/557 |
| 4,829,458 | 5/1989 | Russo et al. | 364/536 |
| 4,897,798 | 1/1990 | Cler | 364/505 |
| 4,942,613 | 7/1990 | Lynch | 364/557 |
| 4,991,770 | 2/1991 | Bird et al. | 336/44 C |
| 5,114,070 | 5/1992 | Lilja et al. | 236/84 X |
| 5,323,961 | 6/1994 | Hurmi | 236/84 X |

FOREIGN PATENT DOCUMENTS

| 687977 | 6/1964 | Canada | 236/84 |
|---|---|---|---|

OTHER PUBLICATIONS

Preliminary Product Description, "SOLOView" American Auto-Matrix, Inc., Oct. 29, 1992, pp. 1–3.
Advertising brochure, "Advanced Concepts for VAV Control", Alerton Technologies, Inc., date unknown.
Technical Instruction brochure, "TH 192 S Single Temperature Room Thermostat", Landis & Gyr Powers, Inc., Jan. 1990.

*Primary Examiner*—William E. Wayner
*Attorney, Agent, or Firm*—Greer, Burns & Crain, Ltd.

[57] ABSTRACT

An electronic digital thermostat is disclosed which is capable of use in a pneumatically controlled temperature control system of the type which has a pneumatic supply line which extends to various components of the control system and wherein the control elements of the system are controlled by varying the control pressure that is communicated to such elements. The thermostat is capable of operating in a LAN system environment, and can be retrofitted into unit ventilators and the like as a substitute for a conventional pneumatic thermostat. The thermostat has a processing means that enables sophisticated control to be achieved.

39 Claims, 9 Drawing Sheets

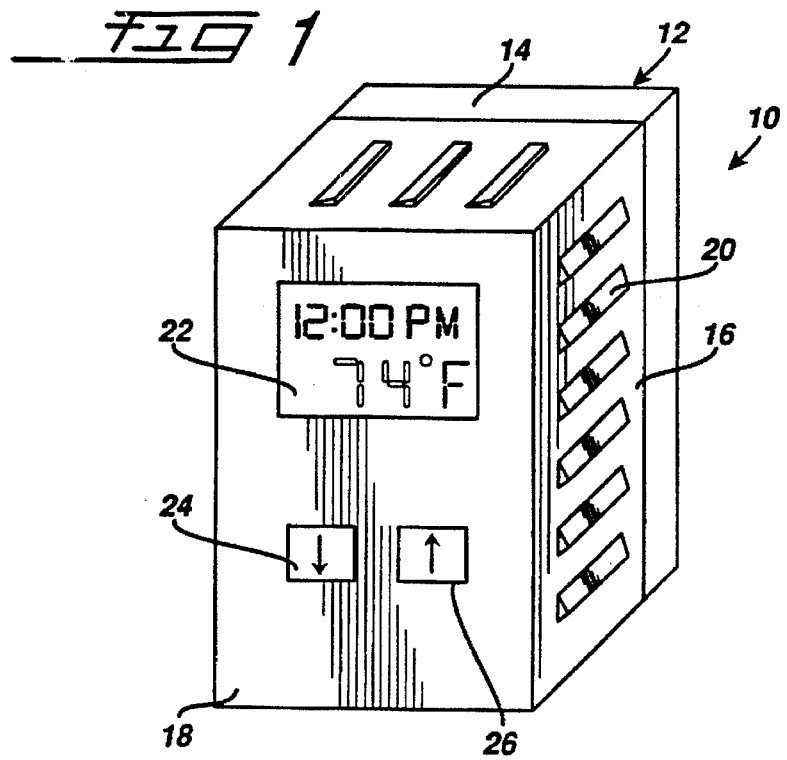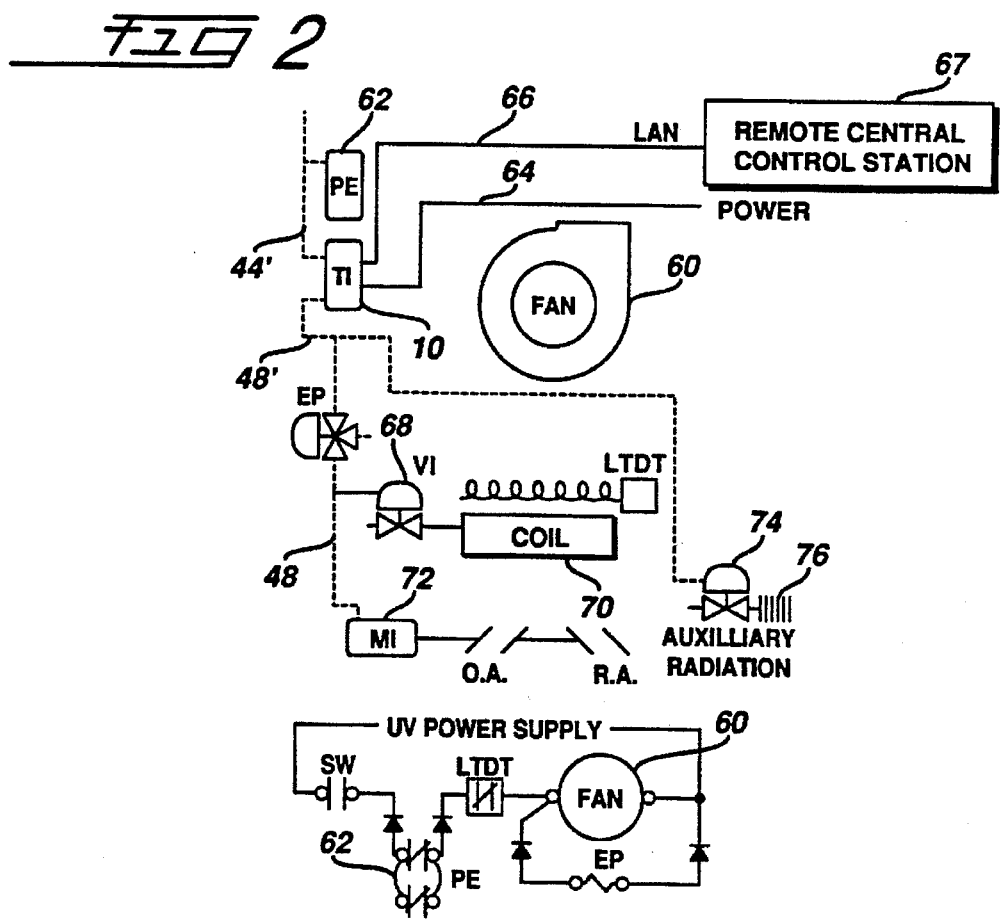

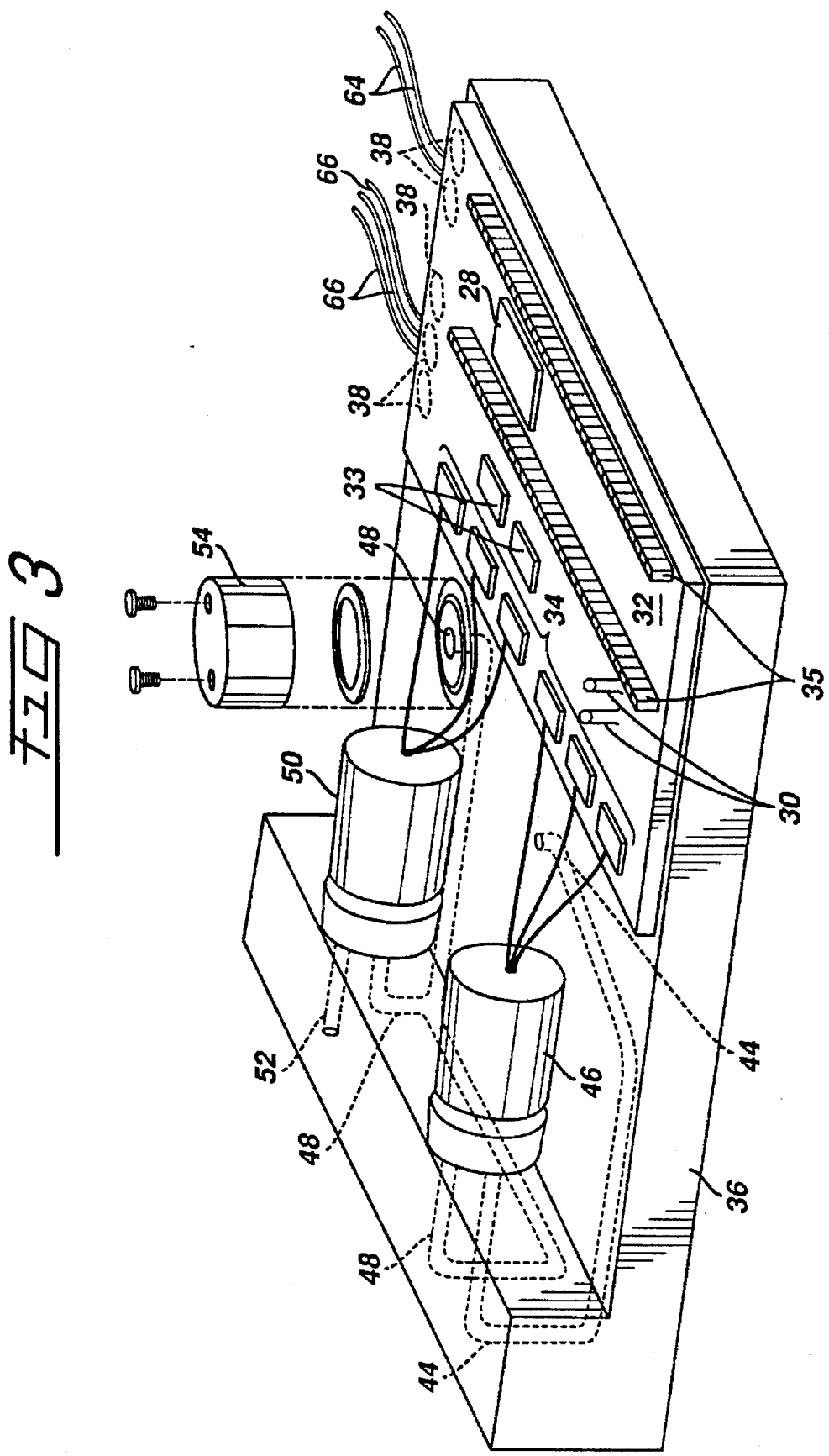

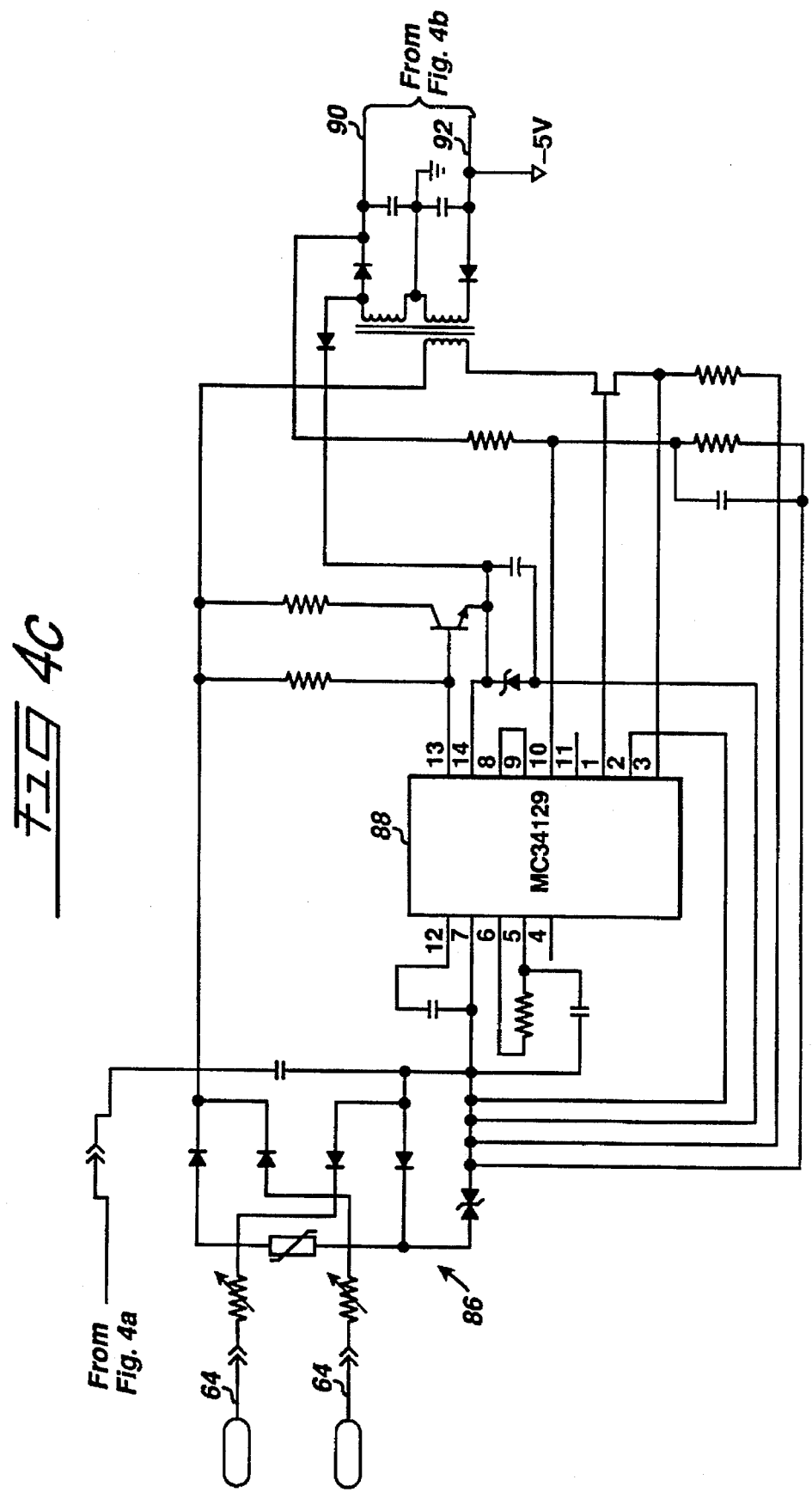

DIRECT DIGITAL CONTROL THERMOSTAT

This is a CIP application of application having Ser. No. 08/276,119, filed Jul. 5, 1994, which is a CIP application of Ser. No. 08/078,605, filed Jun. 16, 1993, both now abandoned.

Cross Reference to Related Applications

A Proportional-Integral-Derivative Controller Having Adaptive Control Capability, Ser. No. 08/078 733, filed Jun. 16, 1993, by Nicolson, et al.

FIELD OF THE INVENTION

The present invention generally relates to thermostats, and more particularly to an electronic thermostat that is adapted for use with pneumatically controlled heating, ventilating and air conditioning systems and apparatus.

It is well known that many building heating, ventilating and air conditioning systems are controlled through the use of pneumatic controls wherein the pressure in the pneumatic lines are controlled and the variable pressure in turn controls pneumatic control valves. The control valves are then used to control the position of dampers, valves which admit heat to heating coils and the like.

Prior art thermostats for such systems have the capability of adjusting the temperature set point for the room or other enclosed area which the thermostats are intended to control, and the thermostats normally operate to provide a controlled pressure in a pneumatic line which is connected to control elements such as dampers, valves and the like and such thermostats operate to admit increased pressure from a pneumatic supply line for the purpose of increasing the temperature and to decrease the pressure in the control line when the temperature is to be reduced. It should be understood by those of ordinary skill in the art that the system can be reverse acting, in that decreasing the pressure can increase the controlled temperature.

The controlled pneumatic pressure typically adjusts the position of the valves, dampers and the like to regulate the temperature in the controlled area. Additionally, there are many buildings which are controlled by pneumatic thermostats which control the operation of unit ventilators, such as are often used in schools. Such unit ventilators are typically stand-alone units and have a fan for circulating air, a heating coil through which steam or hot water may circulate with the amount of flow therethrough being regulated by a valve. While such mechanical pneumatic thermostats adequately control the temperature in the area which they are located, they are generally stand-alone units from a system standpoint, except for the capability of being switched between day/night operation by changing the pressure in the supply pneumatic lines, as is well known in the art.

One major disadvantage of such pneumatic control is the inability to have overall system operation whereby energy conservation schemes can be effectively utilized to reduce costs. Moreover, there is the inability to change temperature set points on a system-wide basis of the individual control of thermostats, among other desirable features that are present in automated supervisory control systems that are now generally used in new construction.

However, while there have been retrofit packages for controlling such pneumatic control systems, they are generally expensive and require substantial labor costs to retrofit existing systems and equipment.

Accordingly, it is a primary object of the present invention to provide an improved thermostat that will provide a pneumatically controlled output so that existing control devices will be controlled thereby, with the thermostat being capable of either stand-alone or system operation.

A related object lies in the provision of such a thermostat being approximately the same size as a conventional pneumatic mechanical thermostat so that it can be mounted in the same location in place of the old thermostat and obtain the above identified system advantages.

Another object of the present invention is to provide such an improved thermostat which is programmable and driven by a microprocessor, is self-contained, and is capable of being connected to a large scale supervisory and control system through a communication network to thereby obtain all of the system benefits that have been heretofore described.

Still another object of the present invention lies in the provision for merely removing an old pneumatic thermostat and replacing it with the improved thermostat of the present invention and provide such system benefits merely by connecting a single communication cable and a power connection. A related object lies in the provision of providing such an improved thermostat that is capable of either stand-alone or system operation and which can be powered by a battery in a stand-alone mode of operation.

Yet another object of the present invention is to provide such an improved thermostat which is driven by a microprocessor and which is capable of executing relatively sophisticated control algorithms in respect to controlling the heating and/or air conditioning equipment with which it is being used.

Other objects and advantages will become apparent from the ensuing detailed description, while referring to the attached drawings, in which:

FIG. 1 is a perspective view of the thermostat embodying the present invention;

FIG. 2 is a schematic diagram of a unit ventilator shown with the improved thermostat embodying the present invention;

FIG. 3 is a perspective view of internal structure of the thermostat shown in FIG. 1;

Figure 4A:
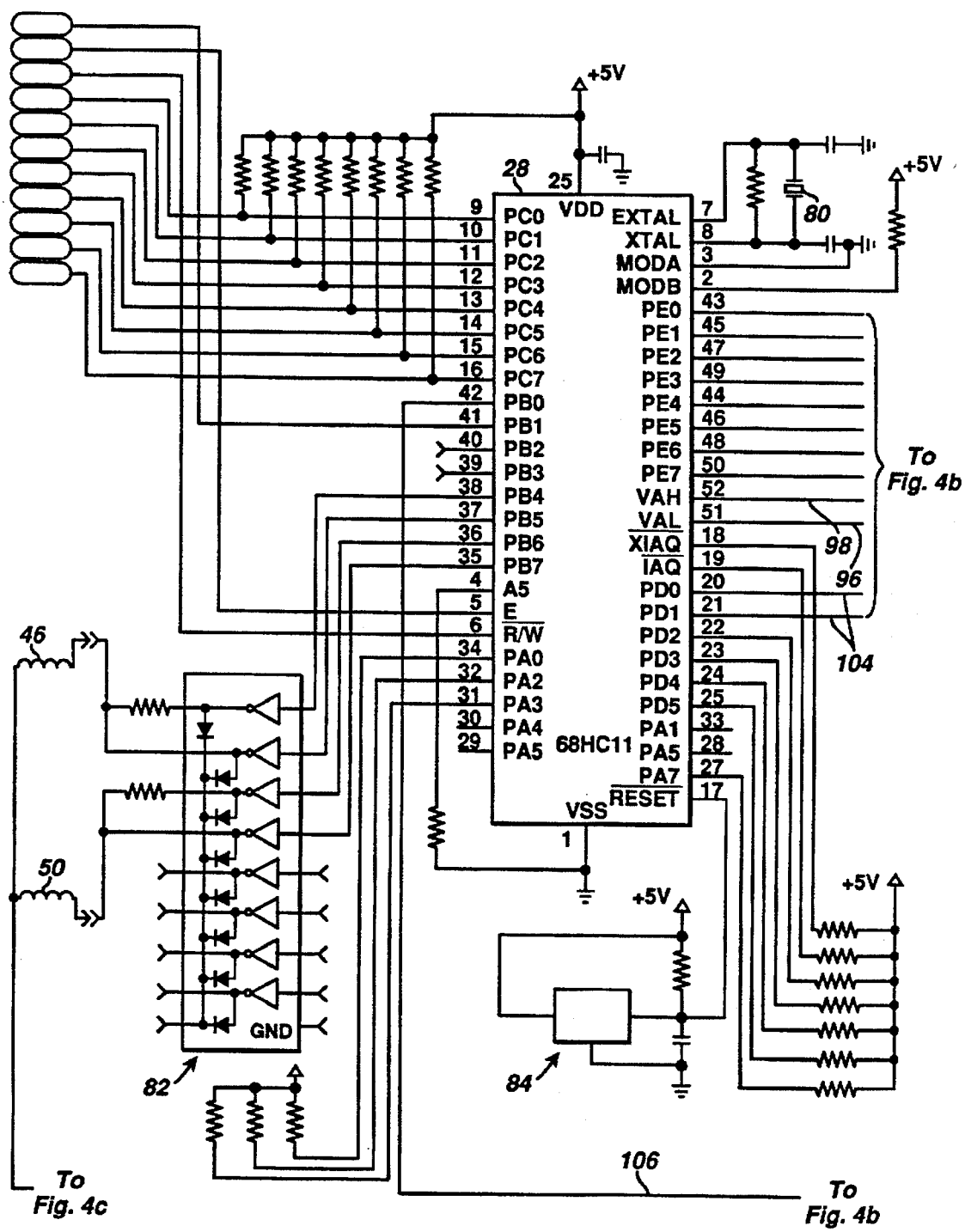
Figure 4B:
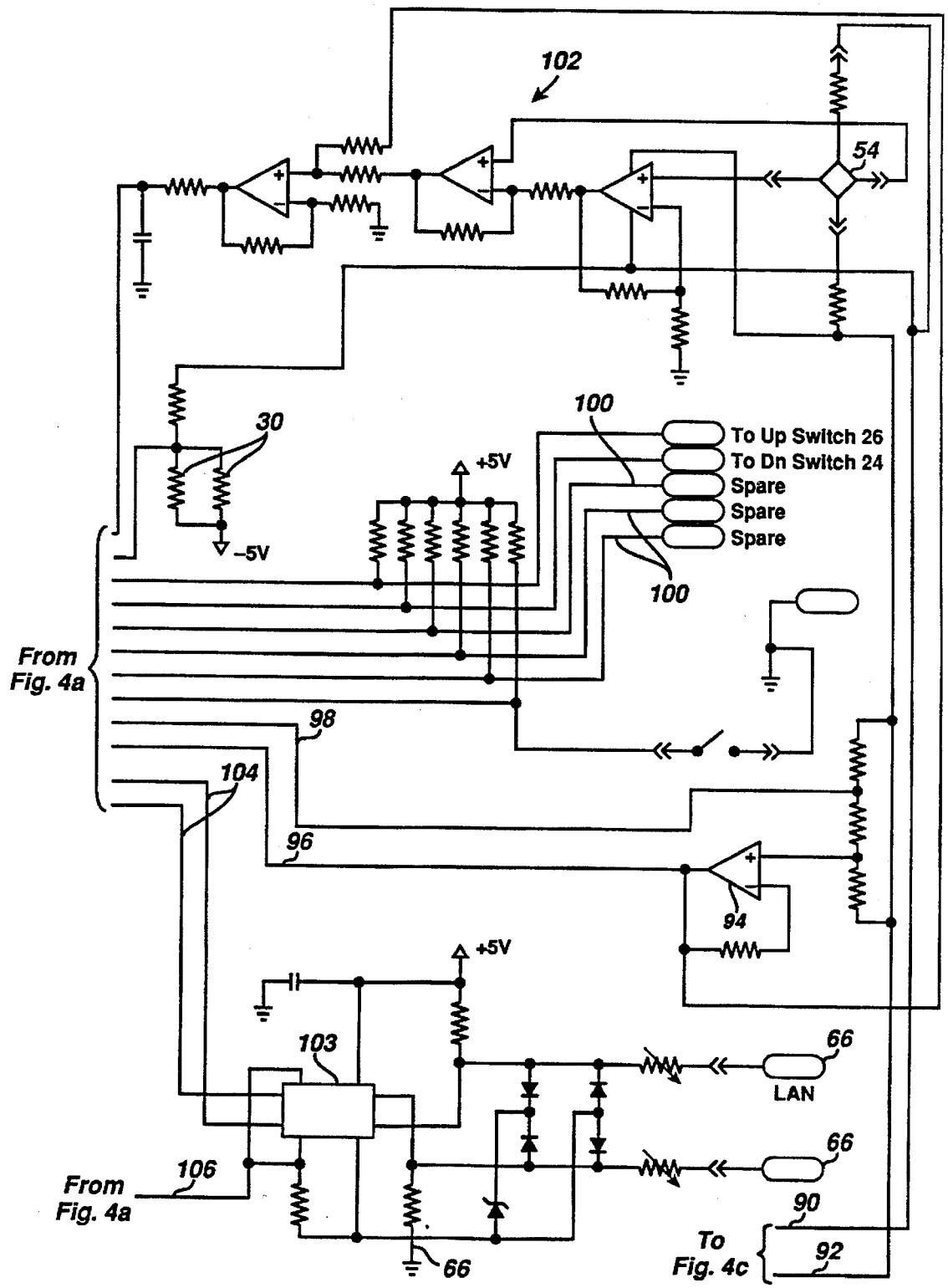
Figure 5:
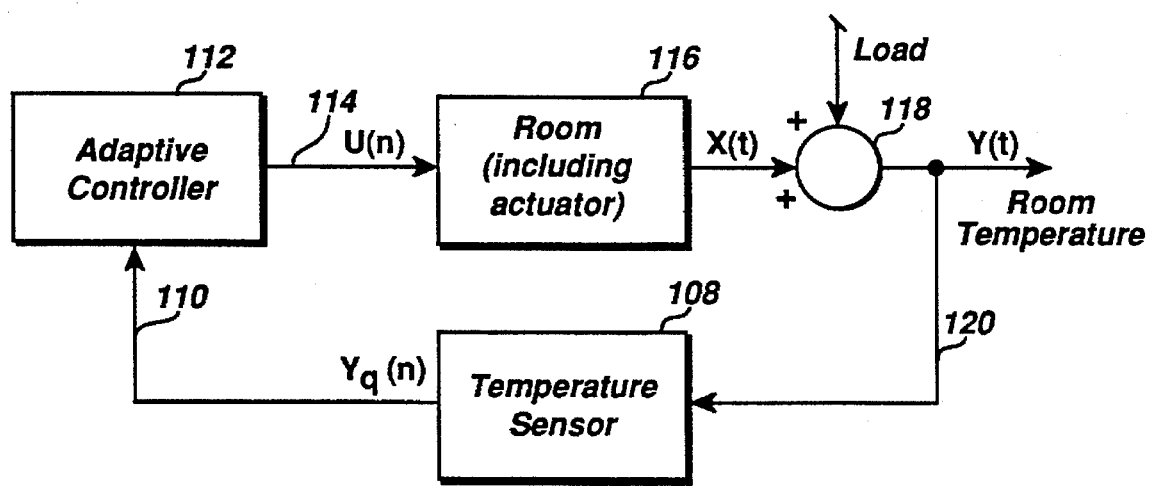
Figure 6:
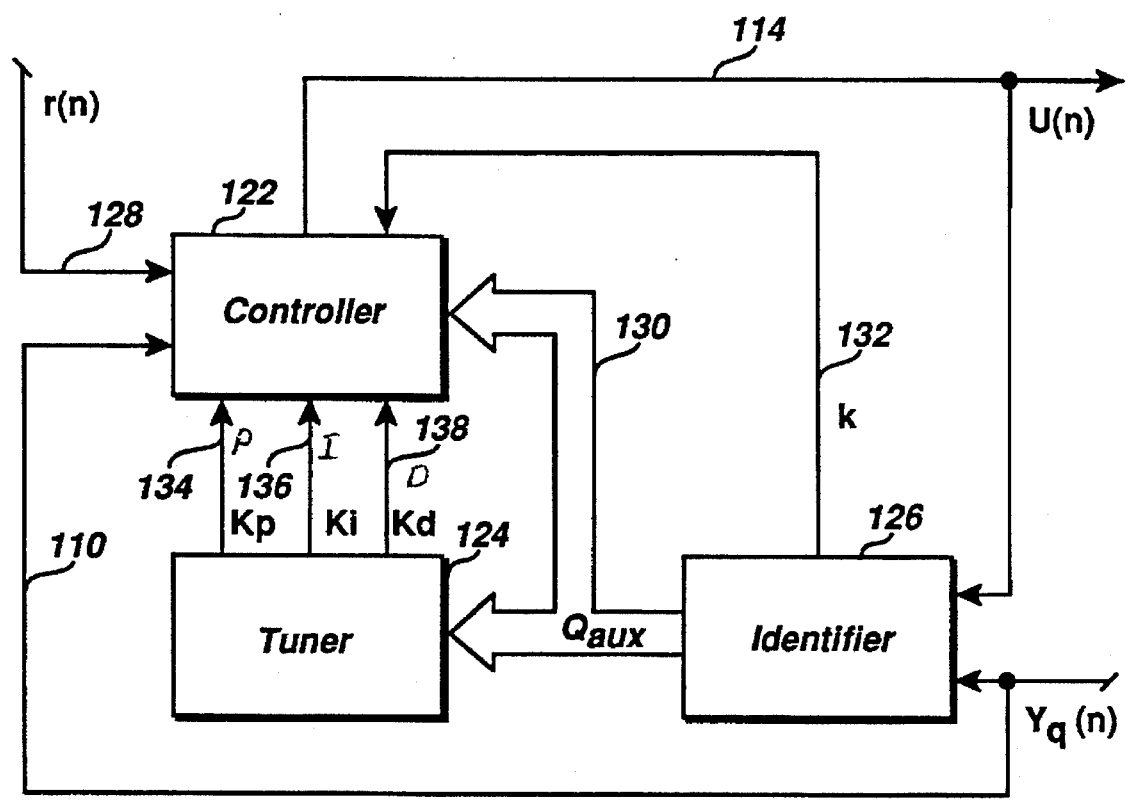
Figure 7:
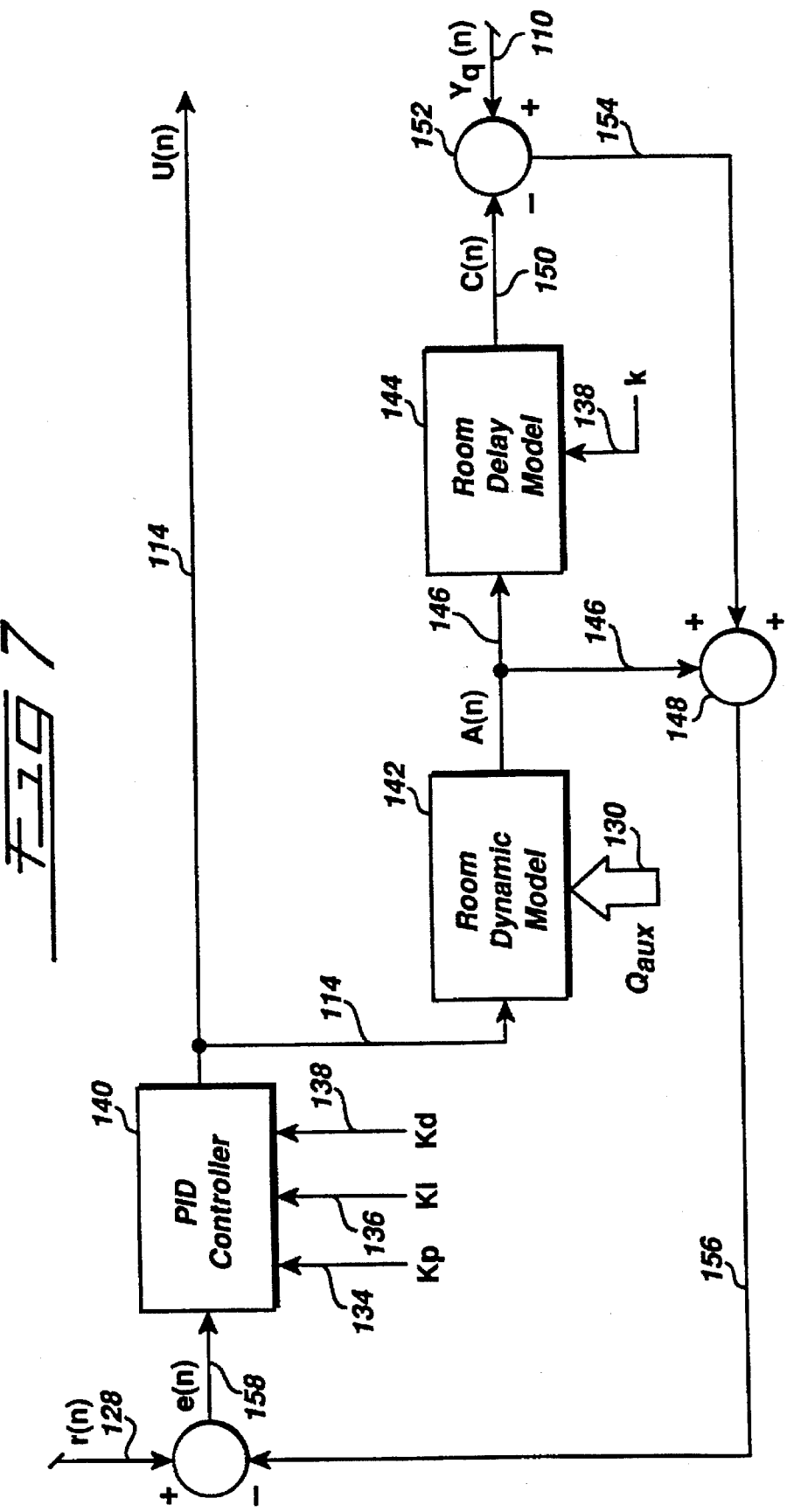
Figure 8:
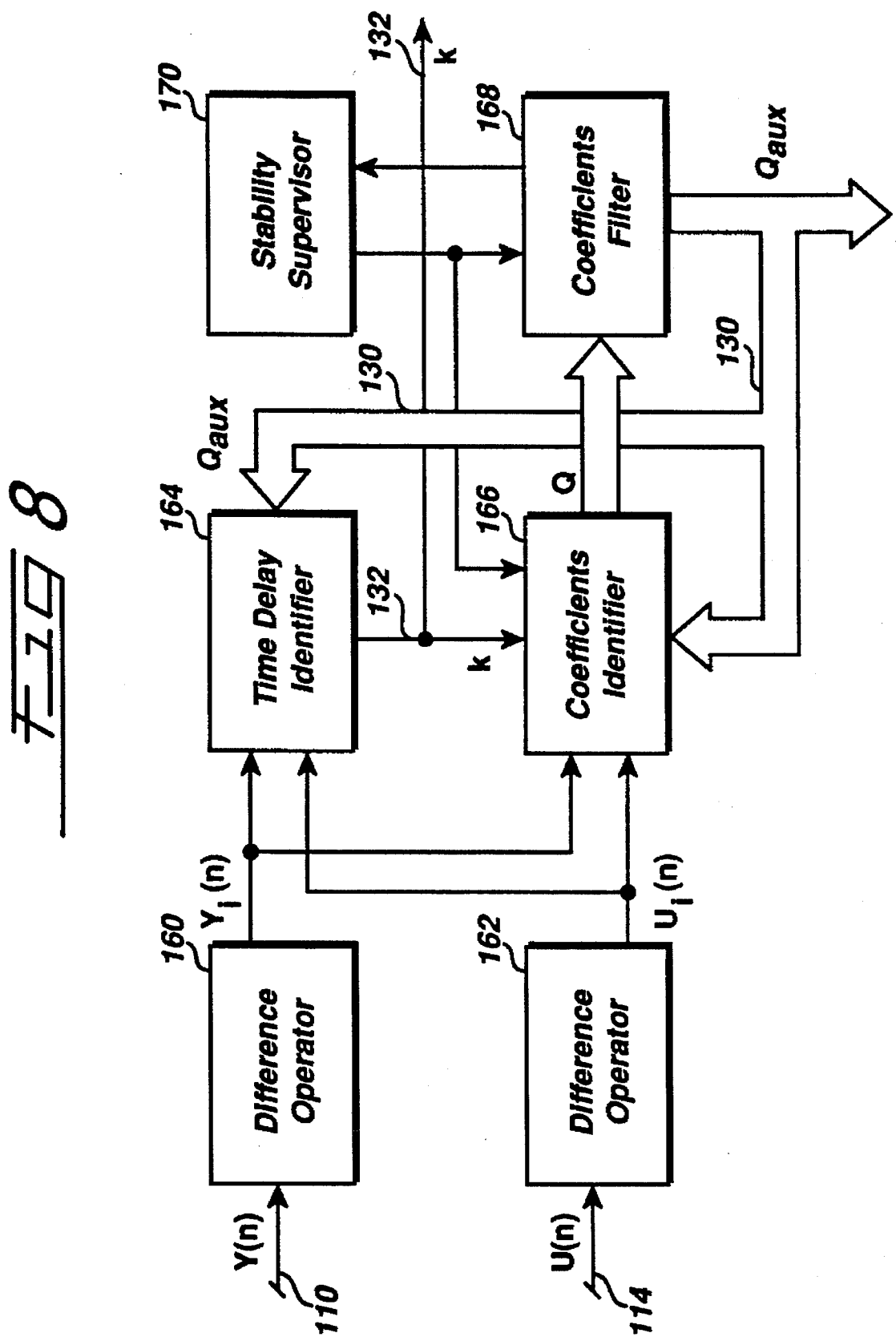

FIGS. 4a, 4b and 4c together comprise a detailed electrical schematic diagram of the circuitry of the thermostat of the present invention;

FIG. 5 is a block diagram of the adaptive loop control system showing the relationship between the control system and the room;

FIG. 6 is a block diagram of the adaptive controller;

FIG. 7 is a detailed flow chart of the adaptive controller, and particularly illustrating the controller shown in FIG. 6;

FIG. 8 is a detailed flow chart of the adaptive control system and particularly illustrating the identifier shown in FIG. 6.

DETAILED DESCRIPTION

The present invention is directed to an electronic digital thermostat which is capable of use in a pneumatically controlled temperature control system of the type which has a pneumatic supply line which extends to various components of the control system and wherein the control elements of the system are controlled by varying the control pressure that is communicated to such elements. For example, pressure within pneumatic control lines may vary to adjust the position of dampers, control valves or the like which control the volume of steam, air and water to heating coils, radiators or the like, or in the case of dampers, controlling the amount of air that is forced into the space that is being controlled.

Such systems generally have been controlled by a pneumatic thermostat that is essentially mechanical in nature and wherein adjustment of the set point for the desired temperature has been performed by manual manipulation and except for the capability of providing day/night modes of operation, very little control is possible through the thermostat. The present invention is intended to be operable with such a pneumatic control system and is capable of standalone operation or with an integrated supervisory and control system if desired. Because of its superior design, it is capable of being merely substituted for a prior pneumatic thermostat without any other alterations or modifications to the control elements or the heating apparatus.

One of the particularly advantageous applications of the present invention is for substitution for a pneumatic mechanical thermostat which controls a unit ventilator of the type which has been commonly used in school systems and the like. Such unit ventilators generally have a fan, a heating coil of which the heating element is steam, hot water or electrical. Such unit ventilators generally do not provide air conditioning in the true sense, but have outside dampers which are capable of admitting outside air which may often be cooler than air in the room. Typically, such unit ventilators are operable in a stand-alone mode and do not have system-wide capabilities which are extremely desirable in terms of efficient energy usage.

Another advantage of the present invention is that it can be connected to an independent power source and it can also be connected via a two wire cable to a communication network, commonly a local area network or LAN, so that it can be operated as a part of a total supervisory and control system. The thermostat of the present invention includes a processing means having internal memory and is therefore capable of running relatively complex control algorithms which are capable of providing proportional control, integral control, as well as derivative control, among other control schemes, such as a Smith predictor type of control scheme.

Day/night and heat/cooling modes of operation can be achieved, with different temperature set points for each mode of operation. The thermostat is manually adjustable so that its set point can be adjusted at the location of the thermostat to suit individual needs if desired, or it can be programmed so that it is not responsive to such individual controls during certain time periods or the like.

Turning now to the drawings, and particularly FIG. 1, a thermostat embodying the present invention, indicated generally at 10, is illustrated and includes an outer enclosure 12 having opposite end walls 14, opposite sidewalls 16 and a front wall 18. The sidewalls preferably have a plurality of openings 20 therein through which air may pass so that a temperature sensing device located within the enclosure will measure the temperature of ambient air in the area which the thermostat is intended to control. In the front face 18 of the thermostat 10, a display 22 is shown.

The display is preferably a liquid crystal display which will illustrate the current temperature, but may display other information, including the current time, the temperature set point of the thermostat, whether it is operating in one of the day or night control modes and the like. The thermostat preferably has a pair of switches 24 and 26, which are illustrated to be up and down arrows and are provided to enable the temperature set point of the thermostat to be either increased or decreased upon pushing the appropriate pushbutton.

Since the thermostat must effectively interface pneumatic lines and electrical circuitry, it is preferred that the electronic components be constructed using a printed circuit board such as is shown in FIG. 3. A processing means 28 is provided, as is a temperature sensing device, preferably a pair of thermisters 30 and other electrical components, which are illustrated in FIG. 4, and which are mounted on a printed circuit board 32, but which are not shown in detail in FIG. 3. Connectors 33 are provided for connection to the display 22 and switches 24 and 26, with the number illustrated in FIG. 3 not being the total number of such connectors but being diagrammatic of the intended construction. It should be understood that a ribbon or zebra connector 35 may be utilized or other appropriate conductors and connectors which are well known in the art and are not in and of themselves part of the present invention.

The connectors 34 are intended to connect the circuitry of the printed circuit board 32 with the electrical pneumatic components that are attached to a base 36 and additional connectors 38 are provided to provide connection to the local area network and to a source of power. The base 36 has a number of openings, not shown, through which the power and LAN connectors may pass. The base plate also has internal ports to which pneumatic lines can be attached, and to this end, the pneumatic supply port 44 is shown connected to an electropneumatic valve 46 to which another pneumatic port 48 is attached and which comprises the controlled output. The port 48 is also connected to a second valve 50 which in turn is connected to a bleed port 52.

It should be understood that the electropneumatic valves 46 and 50 are shown to be generally cylindrical and may be in the form of conventional solenoid valves. However, it should be understood that any suitable control device may be used which is operable in response to appropriate electrical signals being applied thereto. It is conventional practice that the pneumatic pressure in the control port 48 is variable within the range of the supply pressure and atmospheric pressure, and the controlled pressure may be adjusted by operating one or the other of the control valves 46 and 50.

The valves operate to selectively communicate air among the ports 44, 48 and 52 when they are open and isolate one from another when they are closed. In this regard, the pressure in the controlled output port 48 may be increased by opening the valve 46 which communicates the higher supply pressure to the controlled output port. Similarly, if it is intended to decrease the control pressure within the port 48, the valve 50 may be opened to bleed pressure to atmosphere via port 52. The output port 48 may have a small molded manifold piece which is in communication with port 48 and which also includes a pneumatic transducer element, diagrammatically illustrated at 54, for providing an electrical signal to the circuitry of FIG. 4 which is indicative of the controlled pressure in port 48.

The thermostat 10 is adapted for use with apparatus such as a unit ventilator, the schematic diagram of which is shown in FIG. 2, and which has a fan 60 and a pneumatic electric switch 62, for turning the fan on when it is otherwise placed in condition for operation. The thermostat 10 is shown with power lines 64 and LAN lines 66 which can be connected to a remote central control station 67. The thermostat 10 has a pneumatic supply line 44' attached to port 44 and an output line 48' attached to port 48, which line 48' extends to a valve 68 that admits hot water, steam or the like to a heating coil 70. The pneumatic line 48' also extends to a pneumatically controlled damper control 72 and to another valve 74 which controls the flow of steam, hot water or the like to an auxiliary radiation coil 76.

With respect to the electrical schematic circuitry of the thermostat 10, and referring to FIGS. 4a, 4b and 4c, the circuit components which have been previously identified have been given the same reference numerals in this figure for consistency. The circuitry is driven by the processing means 28, (FIG. 4a) which is preferably a model 68HC11 micro-controller manufactured by Motorola. The micro-controller is driven by a clock circuit comprising a crystal 80 that is connected to pins 7 and 8. Pins 9–15 extend to the display 22, via a display driver integrated circuit of conventional design which is not shown.

The valves 46 and 50 are illustrated in FIG. 4a as being solenoid valves and the solenoid which increases the pressure 46 is driven by lines from pins 37 and 38, through a driver circuit 82, while lines from pins 35 and 36 operate the pressure reducing solenoid 50. In this regard, when the solenoid is initially actuated, the up line from pin 37 is activated and it is held by a signal on line from pin 38. The circuitry also includes a power up/down reset circuit 84. Power lines 64 (FIG. 4c) are preferably 24 volt alternating current lines that are applied to a full wave rectifier, indicated generally at 86, (FIG. 4c) which is applied to a switching mode power supply circuit 88, preferably a Model MC34129 manufactured by Motorola. It supplies plus and minus 5 Volts D.C. (VDC) on lines 90 and 92, respectively, which are distributed to various portions of the circuitry as illustrated.

Additionally, lines 90 and 92 are connected to an integrated circuit 94 (FIG. 4b) which provides a reference voltage of 1½ VDC on line 96 and a 4.1 VDC reference voltage on line 98, both of which are respectively connected to pins 51 and 52 of the micro-controller 28 (FIG. 4a). The switches 24 and 26 are connected to pins 49 and 47, respectively, for adjusting the set point of the thermostat and lines 100 are provided as spares for other functional input signals that may be desired. The temperature measuring function is performed by the pair of thermistors 30 connected in parallel with one another which provide an electrical output to the micro-controller at pin 45 that is proportional to the temperature that is sensed. In this regard, two thermistors are used to provide an average value for use by the micro-controller 28.

The pressure transducer 54 has positive and negative outputs which are connected to an amplifier circuit, indicated generally at 102, which provides an amplified signal to pin 43 of the micro-controller. As with conventional pneumatic thermostats, the thermostat 10 compensates for unexpected changes in the controlled pressure due to unexpected line leaks, actuator leaks or other changes in control pressure. Hence the thermostat 10 uses line pressure feedback to maintain the line pressure at a selected level. For example, the signal from the transducer 54 serves as a feedback mechanism, representing the actual pressure in the pressure line which is monitored by the micro-controller. When the controller determines that no change in temperature, hence line pressure, is necessary but the controlled pressure decreases or increases, the micro-controller will open or close the control valves accordingly to maintain a constant control pressure.

In addition, the sensed control pressure signal may be compared to the desired pressure as determined by a PID loop, to determine the suitable change in pressure necessary to obtain the desired temperature. Communication with a LAN network via line 66 is provided by circuitry associated with a RS485 transmission receiver integrated circuit 103 which has lines 104 that extend to pins 20 and 21 of the micro-controller and a select line 106 that extends to pin 42 thereof.

The flow chart for the adaptive control algorithm that controls the operation of the thermostat is shown in FIG. 5 and has a room temperature set point applied by a control dial switch on the thermostat itself or is supplied by a remote control station via the LAN communication. The adaptive controlling algorithm continuously calculates robust controller gains required for accurate temperature control in a room. As the properties and characteristics of the room change, the algorithm adjusts the controller gains appropriately to maintain robust control. The algorithm adapts particularly well to gradual changes in room parameters. Sudden changes, such as a large rise or drop in the temperature of the water going to a heating or cooling coil, cause temporary fluctuations in room temperature, as they would with any controller, but the adaptive controller retunes itself and returns the room to good control.

The algorithm is a single loop controller. One input, $Y_q(n)$, from the room temperature sensor 108 is applied via line 110 to the controller 112 and it provides and output U(n) on line 114 to block 116, which represents the dynamics of the room and the actuator. The output X(t) represents the temperature rise or fall in the room due to the operation of the actuator. The room model symbolically has a summing junction 118 which receives the units of temperature X(t) and the load and the room temperature is represented by Y(t) on line 120 which is sensed by the sensor 108. The load is defined as any temperature effect in the room which is not a direct result of the control efforts as applied through the actuator. The room temperature Y(t) is sampled by the sensor and quantized by no more than 0.25 degrees F, generating signal $Y_q(n)$.

As is shown in FIG. 6, the adaptive controller 112 itself consists of three primary blocks, which consist of a controller block 122, a tuner block 124 and an identifier block 126. These blocks define an algorithm for room temperature control. The controller 122 uses the room temperature setpoint r(n) on line 128 and the actual room temperature Y(n) to create a control signal U(n). This signal drives an actuator in such a way as to keep the actual room temperature at the setpoint. The identifier 126 uses the control signal from the controller and the actual room temperature signal to recursively calculate appropriate parameters for a second order room model, and outputs the parameters in the form of a vector Qaux, identified at 130, and a gain factor k on line 132. Each room has different model parameters, and these parameters can change over time. The identifier is able to zero in on these parameters and track them as they move. The tuner block 124 uses the room model parameter estimates generated by the identifier and calculates appropriate controller gains, i.e., the proportional gain factor $K_p$ on line 134, the integral gain factor $K_i$ on line 136 and the derivative gain factor $K_d$ on line 138, for the controller 122 to use.

Referring to FIG. 7, the controller 122 is illustrated and comprises a Smith Predictor structure with an imbedded PID controller. The estimated room model is used in the structure, but it is divided into two parts. The first part contains the dynamic elements of the model and the second part contains only a time delay. The principle of the Smith Predictor is simple; if the estimated room model is exactly right, then the signal C(n) will be equal to the output of the room, Y(n). The signal ($Y_q(n)$–C(n)) will then be equal to the load. The problem of controlling the room, with its time delay, is then reduced to the problem of controlling the dynamic part of the estimated room model with no time delay. The Smith Predictor limits if not eliminates the effects of a time delay.

The structure of the controller 122 is shown in FIG. 7 to have a PID controller 140, a room dynamic model 142 and a room delay model 144 interconnected as shown. The output U(n) is applied via line 114 to the room dynamic model 142 and the model block 142 provides an output A(n) on line 146 that is applied to the room delay model 144 and to a summing junction 148. The output of the room delay model 144 is C(n) on line 150 and it is compared with the sensed room temperature $Y_q(n)$ on line 110 and the difference determined by summing junction 152 is applied to the summing junction 148 via line 154. The output of the summing junction 148 appears on line 156 that is compared with temperature set point r(n) from line 128 at summing junction 158 to provide an error signal e(n) on line 158 that is applied to the PID controller 140.

The PID in the controller is a standard digital PID. The P, I and D terms are calculated separately and added together and limited between given high and low limits to create the output U(n). The formulas are as follows:

$$P\text{-term} = K_p * e(n)$$
$$I\text{-term}(n) = (K_i * e(n) * T_s) + I\text{-term}(n-1)$$

$$D\text{-term} = \frac{K_d * (e(n) - e(n-1))}{T_s}$$

$$U(n) = (P\text{-term} + I\text{-term} + D\text{-term}) \text{ limited between given high and low values}$$

where e(n)=input error signal, (temp., setpoint, r(n), minus the prediction error (line 156, (FIG. 7)), $T_s$=controller sampling period. The foregoing discussion relating to the controller shown in FIG. 7 also applies to a controller having only proportional-integral control functionality. In such a controller, the above defined D-term would not be present.

The room model includes effects from the actuator, the temperature sensor, and the room itself. The dynamic part of the room model represents the equation:

$$\frac{A(z)}{U(z)} = \frac{b_{1Q} * z^{-1} + b_{2Q} * z^{-2}}{1 + a_{1Q} * z^{-1} + a_{2Q} * z^{-2}}$$

which can be rewritten into the following vector equation:

$$A(n) = (-A(n-1) - A(n-2) U(n-1) U(n-2)) * Q_{aux}$$

where $Q_{aux} = (a_{1Q} \ a_{2Q} \ b_{1Q} \ b_{2Q})^T$, a vector containing the room parameters.

The room delay model simply delays the signal A(n) by the time $k*T_s$. The formula is:

$$C(n) = A(n-k)$$

where k is the time delay length in sample periods.

The tuner 124 calculates PID gains for the controller using the Zeigler-Nichols tuning formulas. Instead of going through the painstaking and time-consuming process of raising the P-gain in successive trials in order to find the "ultimate gain" ($K_{max}$) and the associated period of oscillation ($T_o$), as the classic tuning procedure requires, the ultimate gain is calculated analytically, directly from the estimated room model parameters. The formulas for these calculations are:

$$K_{max} = \frac{(1 - a_{2Q})}{b_{2Q}}$$

$$h = 0.5 * (a_{1Q} + K_{max} * b_{1Q})$$

-continued $$T_0 = \frac{T_s * (2 * \pi)}{\tan^{-1}\sqrt{\frac{(1-h^2)}{(-h)}}}$$

These values are then used in the Ziegler-Nichols formulas to produce robust PID gains:

$$K_p = 0.6 * K_{max}$$

$$K_i = \frac{2 * K_p}{T_0}$$

$$K_d = 0.125 * K_p * T_0$$

In the event a proportional-integral controller is employed, the following formulas are then used to produce robust PI gains:

$$K_p = 0.45 * K_{max}$$

$$K_i = 1.2 * K_p / T_o$$

The identifier shown in FIG. 8 is comprised of six blocks: the two difference operators 160, 162, a time delay identifier 164, a functional coefficients identifier 166, a coefficients filter 168, and a stability supervisor 170.

The difference operator blocks 160, 162 simply subtract the previous value from the current value. These blocks are required because the two identifier blocks 164 and 166 require only the change in a value from sample time to sample time, not the actual value itself. The signals which pass through the difference operators are the output from the controller (U(n)), and the measured room temperature ($Y_q$(n)). The equations used are:

$$Ui(n) = U(n) - U(n-1)$$

$$Yi(n) = Y(n) - Y(n-1)$$

The coefficients identifier determines recursively the values of a set of model parameters which cause predicted model outputs to most closely match actual outputs (room temperature).

The algorithm used is the Recursive Instrumental Variables algorithm. The actual algorithm used, in vector/matrix formulation, is as follows:

$$T = (-Yi(n-1) - Yi(n-2) Ui(n-k-1) Ui(n-k-2))^T$$
$$W = (-h(n-1) - h(n-2) Ui(n-k-1) Ui(n-k-2))^T$$
$$h(n) = W^T * Q_{aux}$$
$$e(n) = Yi(n) - T^T * Q$$

$$K = \frac{P(n-1) * W}{(\beta + T^T * P(n-1) * W)}$$

$$Q(n) = Q(n-1) + K * e(n)$$

$$P(n) = (1/\beta) * (I - K * W^T) * P(n-1)$$
(covariance matrix update)

where $\beta$ is a forgetting factor.

The coefficients filter 168 filters each of the estimated model parameters held in vector Q. The filter 168 is required to ensure that model estimates change very smoothly, which will allow the controller to control more smoothly. The filter 168 used is as follows:

$$Q_{aux}(n)_j = (1-r) * Q_{aux}(n-1)_j + r * (Q(n))_j$$

where r is the filter factor, initially set to 0.01 and j represents corresponding individual elements of the matrices.

The coefficients stability supervisor 170 checks the parameter estimates coming out of the coefficients identifier 166 to make sure that the estimated model is stable. It also checks that $K_{max}$, coming from the tuner 124 is positive, and therefore stable.

A stability test is performed according to the following criteria. The model is unstable if any of the following occurs:

1) $1+a_{1Q}+a_{2Q}>0$

2) $1-a_{1Q}+a_{2Q}>0$

3) $|a_{2Q}|<1$

4) $K_{max} \leq 0$ where the subscript Q indicates a parameter from Q vector (not the $Q_{aux}$ vector).

If any one of these conditions is satisfied, the supervisor does three things:

1. Resets the covariance matrix to all zeros with 0.1 on the major diagonal;
2. Sets the new $Q_{aux}$ to the old $Q_{aux}$, skipping the coefficients filter's Q update;
3. Sets the new $K_{max}$ to the old $K_{max}$, skipping the tuner's $K_{max}$ update for ($K_{max} \leq 0$ only).

The time delay identifier 164 estimates the time delay by evaluating a cost function, J(kt), for different values of kt. The value of kt which results in the lowest J is selected as the estimated time delay, k.

The cost function is evaluated for all integers between the predefined $k_{max}$ and $k_{min}$. The cost function is:

$$J(kt,n) = \beta_k * J(kt,n-1) + (Yi(n) - Yi(n,kt))^2$$

where $\beta_k$ = forgetting factor and Yi(n,kt) = predicted output difference for given possible delay time.

The cost functions run constantly, each evaluating using a different possible time delay, kt. The value for the time delay which is selected and used for parameter estimation and control is the value which results in the lowest J.

From the foregoing, it should be understood that an improved thermostat has been shown and described which has many desirable attributes and advantages. It is particularly adapted to replace a conventional mechanical pneumatic thermostat and provide system-wide control as well as operate in a stand alone mode, because it is driven by a microcontroller having extensive memory, extremely complex control algorithms may be implemented and extreme flexibility in switching from various modes of operation are possible. Because of the extremely compact design, the thermostat is easily installed and is relatively inexpensive to manufacture, given the extraordinary flexibility and capability of operation.

While various embodiments of the present invention have been shown and described, it should be understood that various alternatives, substitutions and equivalents can be used, and the present invention should only be limited by the claims and equivalents thereof.

Various features of the present invention are set forth in the following claims.

What is claimed is:

1. An electronic digital thermostat adapted for use in a pneumatically controlled temperature control system of the type which has at least one pneumatic source line and at least one pneumatic output control line, the pressure in each output control line controlling the temperature of a particular indoor area, said thermostat being adapted to maintain a desired ambient temperature in at least one particular indoor area, said thermostat comprising:

a housing for containing the various means of the thermostat, said housing having a compact overall size;

means for determining and adjusting the temperature set point of the thermostat;

valve means being adapted to be operatively connected to one pneumatic source line and to an exhaust and having a pneumatic output line, said valve means controlling the pressure in said pneumatic output line in response to electrical control signals being applied to said valve means, said controlled pressure being within the range defined by the pressures that exist in said source line and said exhaust;

means for sensing the ambient temperature and generating an electrical signal that is indicative of the sensed temperature;

means for sensing the pneumatic pressure in said pneumatic output line and generating an electrical signal that is indicative of the sensed pressure;

processing means including memory means for storing instructions and data relating to the operation of the thermostat, said processing means being adapted to receive electrical signals that are indicative of sensed temperature and sensed pressure and said temperature set point, and to generate said electrical control signals for controlling said valve means;

means operatively connected to said processing means for communicating with a remote controlling means; and, means for providing power for operating the thermostat.

2. A thermostat as defined in claim 1 further comprising display means operatively connected to said processing means and adapted to provide a visual indication of information relating to the operation of the thermostat.

3. A thermostat as defined in claim 2 wherein said means for determining and adjusting the temperature set point comprises switch means located in said thermostat and operatively connected to said processing means and adapted to provide electrical signals thereto for determining and adjusting the temperature set point.

4. A thermostat as defined in claim 2 wherein said housing generally completely encloses said thermostat, and includes ventilating openings through which ambient temperature air can pass to said temperature sensing means, said housing includes means for attaching the thermostat to a surface, said switch means and display means being visible at the front thereof.

5. A thermostat as defined in claim 4 wherein said housing is rectangular, said switching means comprises two pushbutton switches for adjusting the set point, one switch increasing the set point, the other switch decreasing the set point, said display means comprising a liquid crystal display that is visible from the front of said housing.

6. A thermostat as defined in claim 1 wherein said temperature sensing means comprises thermistor means which generates a signal that is proportional to the sensed temperature.

7. A thermostat as defined in claim 6 wherein said thermistor means comprises a pair of thermistors connected in parallel and providing an averaged signal that is proportional to the temperature sensed by each of said thermistors.

8. A thermostat as defined in claim 1 wherein said pressure sensing means comprises a pressure transducer adapted to provide an electrical signal that is proportional to the pressure sensed.

9. A thermostat as defined in claim 1 wherein said valve means comprises a pair of electrically operable pneumatic solenoid valves, each having two ports, one port of each of said valves being connected to said pneumatic output line, said other port of one of said valves being connected to said exhaust, said other port of the other one of said valves being connected to said pneumatic source line, one of said valves being operable to increase the pressure in said pneumatic output line, the other of said valves being operable to decrease the pressure in said output line.

10. A thermostat as defined in claim 1 wherein said power providing means comprises a connector for connection to an outside power source.

11. A thermostat as defined in claim 1 wherein said power providing means comprises a battery.

12. A thermostat as defined in claim 1 wherein said memory means includes instructions which define day and night modes of operation, with the temperature set points being independently determined for each such mode.

13. A thermostat as defined in claim 1 wherein said memory means includes instructions which define heating and cooling modes of operation, with the temperature set points being independently determined for each such mode.

14. A thermostat as defined in claim 1 wherein said memory means includes instructions which enable communications to be received from a remote controller, and data which defines the identification of the thermostat.

15. A thermostat as defined in claim 14 wherein said memory means includes instructions which enable a remote controller to adjust the set points for the thermostat for each of the heating, cooling, day and night modes of operation.

16. A thermostat as defined in claim 15 wherein said memory means includes default instructions which define a temperature control program which carries out the control of said thermostat.

17. A thermostat as defined in claim 16 wherein said memory means instructions which enable said remote controller to adjust said temperature control program.

18. A thermostat as defined in claim 16 wherein said memory means includes instructions which define a temperature control program which carries out proportional, derivative and integral control of said thermostat to be defined by said remote controller.

19. A thermostat as defined in claim 18 wherein said memory means includes instructions which enable the gain values of the proportional, derivative and integral control to be adjusted by said remote controller.

20. A thermostat as defined in claim 14 wherein said memory means includes instructions which define default settings for the operation of said thermostat, said default settings being used in the event of a power failure of said thermostat or a break in communication with said remote controller.

21. A thermostat as defined in claim 14 wherein said memory means includes instructions which define the frequency at which said temperature control program is executed.

22. A system for controlling a temperature control system for one or more indoor areas to maintain a desired ambient temperature in each such area, wherein said temperature control system is of the type which has at least one pneumatic source line and one or more pneumatic output control lines, the pressure in each output control line being thermostatically controlled to control the temperature of a particular indoor area, said system comprising:
   a remote controlling means and at least one electronic digital thermostat;
   said remote controlling means being adapted to communicate with a plurality of said individual thermostats, said remote controlling means including a central computing means adapted to provide instructions and data relating to the operation of said individual thermostats, and including memory means having instructions and data relating to the operation of said thermostat, said controlling means including means for communicating with said thermostats and for adjusting the operation of the same;
   each of said electronic digital thermostats further comprising:
   a housing for containing the various means of the thermostat, said housing having a compact overall size;
   valve means being adapted to be operatively connected to a pneumatic source line and to an exhaust and having a pneumatic output line, said valve means controlling the pressure in said pneumatic output line in response to electrical control signals being applied to said valve means, said controlled pressure being within the range defined by the pressures that exist in said source line and in said exhaust;
   means for sensing the ambient temperature and generating an electrical signal that is indicative of the sensed temperature;
   means for sensing the pneumatic pressure in said pneumatic output line and generating an electrical signal that is indicative of the sensed pressure;
   local processing means including memory means for storing instructions and data relating to the operation of the thermostat, said local processing means being adapted to receive said signals indicative of sensed temperature and sensed pressure and to generate said electrical control signals for controlling said valve means;
   means operatively connected to said local processing means for communicating with said remote controlling means;
   means operatively connected to said local processing means for determining and adjusting the temperature set point of the thermostat; and,
   means for providing power for operating each of said thermostats.

23. A system as defined in claim 22 wherein at least one of said thermostats further includes display means operatively connected to said local processing means and adapted to provide a visual indication of information relating to the operation of the thermostat.

24. A system as defined in claim 22 wherein said housing of each of said thermostats generally completely encloses said thermostat, and includes ventilating openings through which ambient temperature air can pass to said temperature sensing means, said housing includes means for attaching the thermostat to a surface, said switch means and display means being visible at the front thereof.

25. A system as defined in claim 24 wherein said housing is rectangular, said switching means comprises two pushbutton switches for adjusting the set point, one switch increasing the set point, the other switch decreasing the set point, said display means comprising a liquid crystal display that is visible to an observer.

26. A system as defined in claim 22 wherein each of said temperature sensing means comprises a thermistor means which generates a signal that is proportional to the sensed temperature.

27. A system as defined in claim 22 wherein said valve means comprises a pair of electrically operable pneumatic solenoid valves, each having two ports, one port of each of said valves being connected to said pneumatic output line, said other port of one of said valves being connected to said exhaust, said other port of the other one of said valves being connected to said pneumatic source line, one of said valves being operable to increase the pressure in said pneumatic output line, the other of said valves being operable to decrease the pressure in said output line.

28. A system as defined in claim 22 wherein said power providing means comprises a connector for connection to an outside power source.

29. A system as defined in claim 22 wherein said power providing means comprises a battery.

30. A system as defined in claim 22 wherein said memory means of said central computing means includes instructions which define day and night modes of operation, with the temperature set points being independently determined for each such mode, said central computing means being adapted to write said instructions into said memory means of each of said local processing means.

31. A system as defined in claim 22 wherein said memory means of said central computing means includes instructions which define heating and cooling modes of operation, with the temperature set points being independently determined for each such mode, said central computing means being adapted to write said instructions into said memory means of each of said local processing means.

32. A system as defined in claim 22 wherein said memory means of said local processing means includes instructions which enable communications to be received from said central computing means and data which defines a unique identification of each of the thermostats.

33. A system as defined in claim 31 wherein said memory means of said central computing means includes instructions which enable said central computing means to adjust the set points for the thermostat for each of the heating, cooling, day and night modes of operation.

34. A system as defined in claim 33 wherein said memory means of each of said local processing means includes default instructions which define at least one temperature control program having operating parameters, which program carries out the control of said thermostat.

35. A system as defined in claim 34 wherein said memory means of said central computing means includes instructions which enable said central computing means to adjust the parameters of said temperature control program, said central computing means being adapted to write said instructions into said memory means of each of said local processing means.

36. A system as defined in claim 34 wherein said memory means of said central computing means includes instructions which define a temperature control program which carries out proportional, derivative and integral control of said thermostat to be defined by said remote controller, said central computing means being adapted to write said instructions into said memory means of each of said local processing means.

37. A system as defined in claim 35 wherein said memory means of said central computing means includes instructions which enable the gain values of the proportional, derivative and integral control located in the memory means of the local processing means to be adjusted by said remote controller, said central computing means being adapted to write said instructions into said memory means of each of said local processing means.

38. A system as defined in claim 32 said memory means of said local processing means includes instructions which define default settings for the operation of said thermostat, said default settings being used in the event of a power failure of said thermostat or a break in communication with said central computing means.

39. A system as defined in claim 32 wherein said memory means of said central computing means includes instructions which define the frequency at which said temperature control program is executed, said central computing means being adapted to write said instructions into said memory means of each of said local processing means.

* * * * *